Jan. 7, 1941.  S. PETRONE  2,227,861
ARTIFICIAL CHRISTMAS TREE
Filed Dec. 7, 1939  2 Sheets-Sheet 1
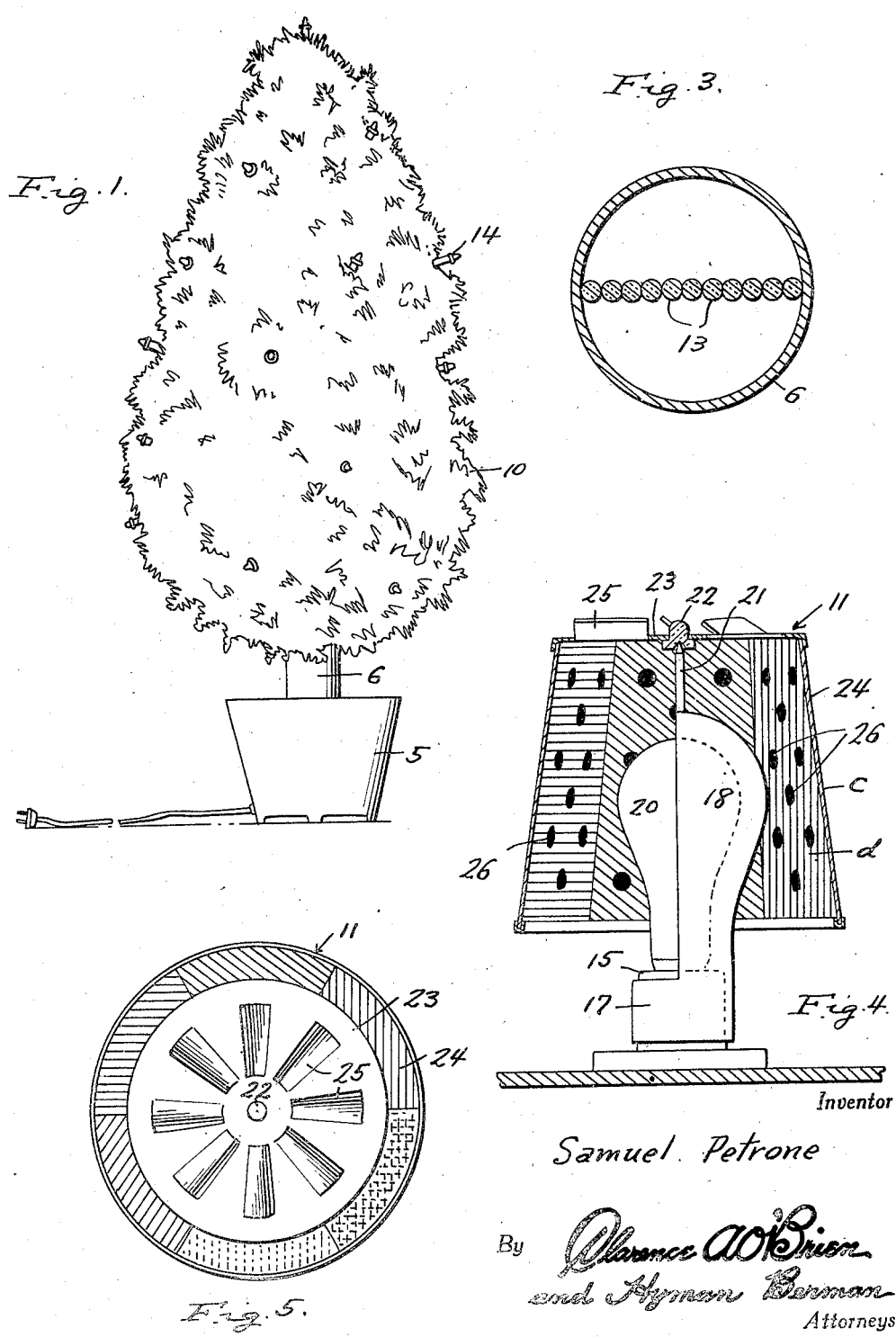
Inventor
Samuel Petrone
By Clarence A. O'Brien
and Hyman Berman
Attorneys

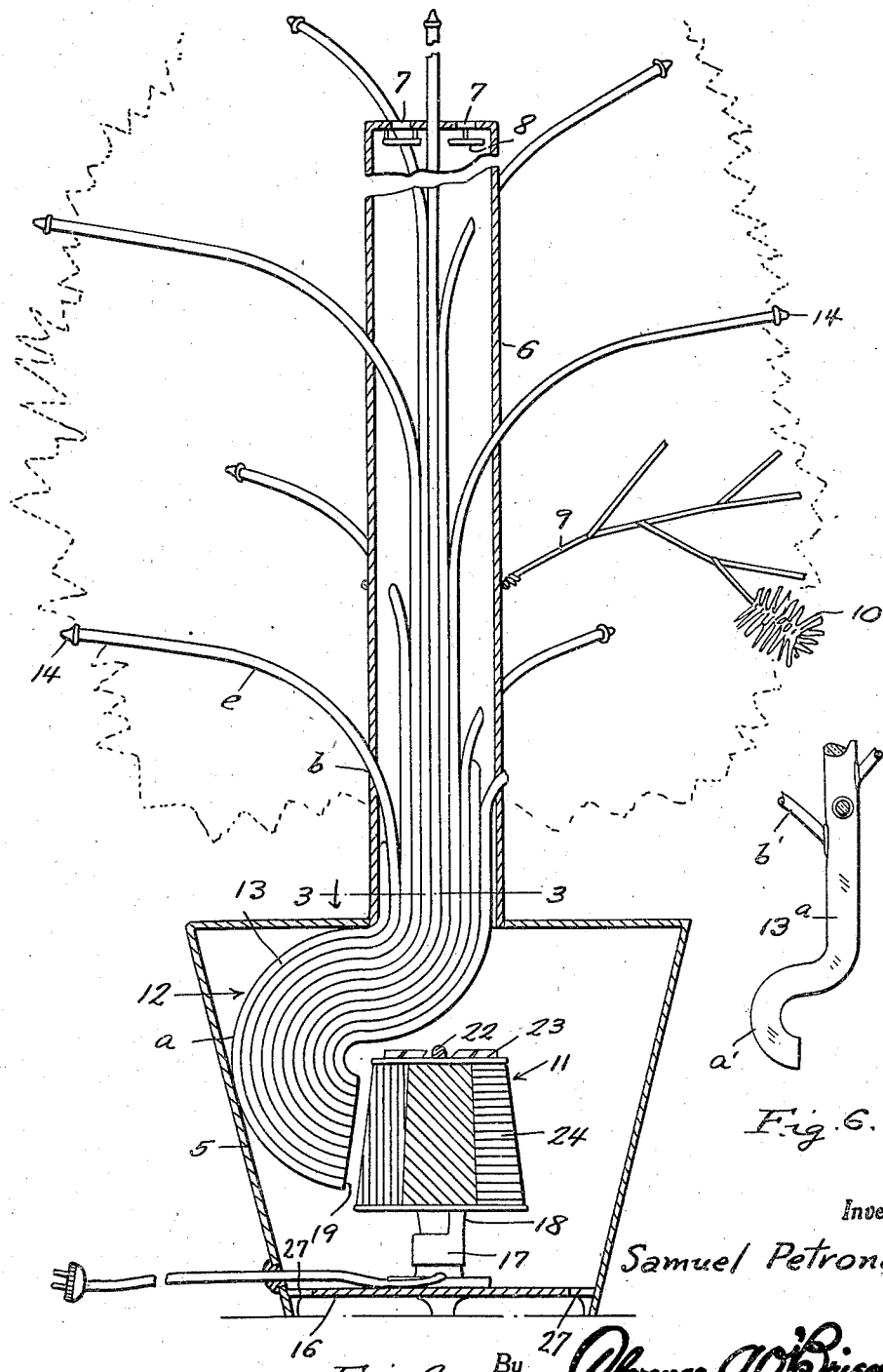

Patented Jan. 7, 1941

2,227,861

UNITED STATES PATENT OFFICE 2,227,861

ARTIFICIAL CHRISTMAS TREE

Samuel Petrone, Erie, Pa., assignor of one-half to
Nick Mazzone, Erie, Pa.

Application December 7, 1939, Serial No. 308,074

6 Claims. (Cl. 240—10.1)

This invention relates to new and useful improvements in artificial trees, and more particularly to an illuminated tree particularly designed for Christmastide display.

The principal object of the present invention is to provide an artificial tree having illuminating means in which elements are illuminated and wherein the elements are continuously changing color and producing a scintillating effect.

Another important object of the invention is to provide an artificial tree including a plurality of illuminating elements which receive their light source from a single electric bulb.

Other objects and advantages of the invention will become apparent to the reader of the following specification.

In the drawings:

Figure 1 represents a side elevational view of the tree.

Figure 2 is a vertical sectional view through the tree.

Figure 3 is a cross-section on the line 3—3 of Figure 2.

Figure 4 is a fragmentary vertical sectional view through the light source.

Figure 5 is a top plan view of the color shade.

Figure 6 is a fragmentary side elevational view of a modified form of light carrier.

Referring to the drawings wherein like numerals designate like parts, it can be seen that numeral 5 denotes a plant pot-shaped housing from the top of which rises the elongated tube or trunk 6, this trunk being of hollow design and having air openings 7 at the upper end thereof below which are mounted baffles 8. Laterally from this trunk 6 extends the artificial tree branches 9, which can carry clusters 10 simulating the needles or other foliage of a tree.

Numeral 11 generally refers to the light and color source, while numeral 12 generally refers to the colored light carrying means.

The colored light carrying means consists of a plurality of elongated glass or other material rods 13 which have the faculty of internal reflection of light to the end that colored light is transmitted from one end thereof to the other. As shown in Figure 2, the lower ends of these rods are curved in a substantial semi-circular shape as denoted by $a$ and then extended upwardly in the trunk 6 to a particular opening $b$ through which the tube extends in a long sweeping curve $e$.

The outer ends of the glass rods 13 are equipped with glass beads 14 of tapered shape, as shown in Figure 2.

The light source 11 consists of the socket 15 mounted on the bottoms 16 of the pot 5. A band 17 around the socket 15 supports the reflector 18 which reflects light toward the lower extremities 19 of the rods 13. A bulb 20 is mounted in the socket 15, as shown in Figure 4.

Rising from the upper end of the reflector 18 is the bearing pin 21, pointed at its upper end to engage into the glass or jewel bearing element 22 which is fitted into an opening in the top 23 of the color shade 24, this shade having the downwardly flaring apron portion $c$ divided into sections $d$ for varied color material. The top 23 is struck out to provide the inclined baffles 25 which are, of course, struck by heated air rising through the shade. As the heated air rising through the shade strikes the baffles 25, the shade is, of course, turned on the pin 21 and different colored panels $d$ are brought into position between the bulb 20 and the extremities 19 of the rod 13, so that the color of the light transmitted to the rods is continuously changing. The light is transmitted along the rods, illuminating the buttons 14, to the end that the color of these buttons is continuously changing and this through the use of only a single electric bulb 20.

If desired, a single glass rod 13a can be employed with the portions extending externally of the trunk 6, being disposed off in long sweeping curves as at $b'$, this being suggested in Figure 6. The lower end of this rod 13a will have a single semi-circular curved end portion $a'$.

The shade 24 is preferably provided with an arrangement of dots 26 which will have the effect of interrupting the light to the rods 12, this resulting in the optical illusion at the tips 14 of scintillation or flame semblance.

The base 16 is formed with air openings 27 so that there will be a plentiful supply of air to be heated by the bulb and cause rotation of the shade 24.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An artificial tree comprising a hollow base, a hollow trunk rising from the base, artificial foliage arranged on the trunk, a light source in the base, light reflecting elements arranged at the outer portion of the foliage, and light transmission lines extending from the base and through the trunk from the source of light to the said reflectors and a color changing device interposed between the transmission lines and the source of light.

2. An artificial tree comprising a hollow base, a hollow trunk rising from the base, artificial foliage arranged on the trunk, a light source in the base, light reflecting elements arranged at the outer portion of the foliage, and light transmission lines extending from the base and through the trunk from the source of light to the said reflectors and a color changing device interposed between the transmission lines and the source of light, said color changing means consisting of heated air rotated shade having a plurality of vari-colored sections successively interposable between the source of light and the lines.

3. An artificial tree comprising a hollow base, a light source in the base, artificial foliage mounted above the base, light reflecting elements arranged at the outer portion of the foliage, light transmission lines extending from the base and through the foliage to the reflectors and a color changing device interposed between the transmission lines and the source of light, said color changing device consisting of a substantially cylindrical shade rotatably mounted on a substantially vertical axis around the source of light, the portions of the light transmission lines being curved to terminate immediately in opposed relation to the side wall of the said shade.

4. An artificial tree comprising a hollow base, a light source in the base, artificial foliage mounted above the base, light reflecting elements arranged at the outer portion of the foliage, light transmission lines extending from the base and through the foliage to the reflectors and a color changing device interposed between the transmission lines and the source of light, said color changing device consisting of a substantially cylindrical shade rotatably mounted on a substantially vertical axis around the source of light, the portions of the light transmission lines being curved to terminate immediately in opposed relation to the side wall of the said shade, said light source being provided with a reflector for reflecting light toward the adjacent terminals of the light transmission lines.

5. An artificial tree comprising a hollow base, a light source in the base, artificial foliage mounted above the base, light reflecting elements arranged at the outer portion of the foliage, light transmission lines extending from the base and through the foliage to the reflectors and a color changing device interposed between the transmission lines and the source of light, said color changing device consisting of a substantially cylindrical shade rotatably mounted on a substantially vertical axis around the source of light, the portions of the light transmission lines being curved to terminate immediately in opposed relation to the side wall of the said shade, said light source being provided with a reflector for reflecting light toward the adjacent terminals of the light transmission lines, said shade being provided with a top, a bearing in the top, and a supporting pin rising from the reflector and engaged with the said bearing for rotatably supporting the said shade.

6. An artificial tree comprising a hollow base, a light source in the base, artificial foliage mounted above the base, light reflecting elements arranged at the outer portion of the foliage, light transmission lines extending from the base and through the foliage to the reflectors and a color changing device interposed between the transmission lines and the source of light, said color changing device consisting of a substantially cylindrical shade rotatably mounted on a substantially vertical axis around the source of light, the portions of the light transmission lines being curved to terminate immediately in opposed relation to the side wall of the said shade, said light source being provided with a reflector for reflecting light toward the adjacent terminals of the light transmission lines, said shade having spots thereon for intercepting light from the light source and effecting a scintillating reflection of light at the reflecting element.

SAMUEL PETRONE.